United States Patent [19]

Distaso et al.

[11] Patent Number: 5,821,209
[45] Date of Patent: Oct. 13, 1998

[54] WATER IN OIL EMULSIONS CONTAINING A TERPENE, BENZYL ALCOHOL, AND WAX

[75] Inventors: John Distaso, Orange; Azucena G. De Guzman, Cerritos, both of Calif.

[73] Assignee: Elf Atochem North America, Inc., Philadelphia, Pa.

[21] Appl. No.: 804,651

[22] Filed: Feb. 25, 1997

[51] Int. Cl.$^6$ .................. C11D 7/26; C11D 7/24; C11D 7/50; B08B 3/08

[52] U.S. Cl. .................. 510/207; 510/206; 510/203; 510/208; 510/209; 510/212; 510/417

[58] Field of Search .................. 510/206, 207, 510/203, 208, 209, 212, 417; 134/38

[56] References Cited

U.S. PATENT DOCUMENTS

| | | | |
|---|---|---|---|
| 4,414,128 | 11/1983 | Goffinet | 252/111 |
| 4,732,695 | 3/1988 | Francisco | 252/162 |
| 5,011,621 | 4/1991 | Sullivan | 252/162 |
| 5,171,475 | 12/1992 | Freiesleben | 252/312 |
| 5,277,836 | 1/1994 | Peters | 252/143 |
| 5,387,363 | 2/1995 | Distaso | 252/163 |
| 5,405,548 | 4/1995 | Distaso | 252/170 |
| 5,411,678 | 5/1995 | Sim | 252/548 |
| 5,425,893 | 6/1995 | Stevens | 252/166 |
| 5,427,710 | 6/1995 | Stevens | 252/166 |
| 5,454,985 | 10/1995 | Harbin | 252/558 |
| 5,478,491 | 12/1995 | Jarema | 252/171 |
| 5,518,661 | 5/1996 | Langford et al. | 252/364 |
| 5,542,986 | 8/1996 | Distaso | 134/38 |
| 5,569,410 | 10/1996 | Distaso | 510/202 |
| 5,605,579 | 2/1997 | Distaso | 134/38 |
| 5,637,559 | 6/1997 | Koreltz et al. | 510/201 |
| 5,744,438 | 4/1998 | Distaso | 510/207 |

*Primary Examiner*—Douglas J. McGinty
*Attorney, Agent, or Firm*—Stanley A. Marcus; William D. Mitchell

[57] ABSTRACT

Improvements in the retardation of water evaporation from benzyl alcohol containing water-in-oil emulsions by incorporating in the organic phase thereof an effective amount of a terpene.

21 Claims, No Drawings

WATER IN OIL EMULSIONS CONTAINING A TERPENE, BENZYL ALCOHOL, AND WAX

FIELD OF THE INVENTION

The present invention relates to improvements in retardation of the evaporation of solvents such as water from paint stripping formulations comprising water-in-oil emulsions containing benzyl alcohol, the improvement resulting from incorporating in the oil phase thereof an effective amount of a terpene such as d-limonene.

BACKGROUND OF THE INVENTION

The benzyl alcohol based, water in oil emulsions to which this invention is directed are described, for example, in U.S. Pat. No. 5,542,986 (referred to herein as "the '986 patent") and in copending U.S. patent application Ser. Nos. 08/706,850 and 08/707,261 (referred to herein as "the '850 and '261 applications"), the entire specifications of which are hereby incorporated by reference. Particularly preferred are the wax containing water-in-oil emulsions of the '850 and '261 applications.

SUMMARY OF THE INVENTION

In paint stripper formulations containing a water-in-oil emulsion having a water phase and a continuous benzyl alcohol (oil) phase, an improvement is provided which comprises incorporating a terpene such as d-limonene in the benzyl alcohol phase in an amount effective to retard evaporation of volatiles from the water phase. Preferred embodiments include alkaline strippers where ammonia is incorporated in the emulsion's water phase and acid strippers where benzyl formate is incorporated in the emulsion's benzyl alcohol phase. Other preferred embodiments include the incorporation of anisole and/or, in the ammonia containing strippers, pyrrole to enhance the stripping rate.

DETAILED DESCRIPTION OF THE INVENTION

It has now been found that incorporation of one or more terpenes into the organic, benzyl alcohol phase of a water-in-oil emulsion retards evaporation of water and other solvents from an inverse emulsion paint stripper, so that the use life of such strippers can be extended to 24 hours or more. Examples of such terpenes are d-limonene (preferred), dipentene (also known as 1-methyl-4-(1-methylethenyl)-cyclohexene), myrcene, alphapinene, linalool and mixtures thereof.

The wax-containing water-in-oil emulsions of the '850 and '261 applications are particularly advantageous in paint removers since the emulsions, among other things, reduce odor and the wax (natural or synthetic) improves the stripping efficiency by further retarding evaporation of ingredients such as water and other volatiles that enhance stripping. When wax is incorporated, it is generally used in an amount which is slightly in excess (1% by weight) of that which would saturate the organic phase. A preferred wax is paraffin wax (which term includes its individual components). Paraffin or mineral oil, vegetable wax, microcrystalline wax, ceresine wax and montan wax may similarly be used.

The terpene is generally used in an amount of between about 0.5 and 24.0 weight %, based on the total weight of the emulsion (preferably from about 4 to about 8%), depending on the substrate to be stripped, the amount of solvents (and wax, if any) in the stripper formulation, and so on. At higher terpene levels solubilization of the wax can occur, while at lower levels solvency can be lost.

Anisole and/or pyrrole can also be added to enhance the stripping rate in amounts of from about 2 to about 20 weight %, preferably from about 8 to about 16%. When both are added to an ammonia-containing stripper, an optimized system is generally one which has about 5–9% terpene, about 8–16% anisole, and about 0.3–8% pyrrole.

The amount of wax incorporated in the emulsion of the preferred strippers is normally from about 0.02 to about 5.0 percent by weight, based on the total weight of the emulsion, more typically from about 0.1 to about 1.0%. Any type of commercially available paraffin wax or ceresine wax (or their components) can be used. Most paraffin waxes have a melting point in the range of about 47° to 65° C.

With reference to the '850 and '261 applications and the '986 patent, a paint stripper formulation employing such an emulsion can be made by mixing together water, benzyl alcohol (and, if desired, formic acid, a portion of which reacts with a portion of the benzyl alcohol to form, in situ, some benzyl formate and additional water; alternatively, the same equilibrium mixture of water, benzyl alcohol, formic acid and benzyl formate can be formed by starting with the equilibrium mixture or with a corresponding equivalent amount of benzyl formate, water and, optionally, benzyl alcohol or formic acid if it is desired to have a molar excess of benzyl alcohol or formic acid, respectively); terpene; wax, if any; up to about 2% by weight of thickeners (such as a hydroxypropyl cellulose or methylcellulose); up to about 15% by weight of a hydrocarbon solvent (aromatic or aliphatic, including petroleum distillates) to help wet the thickener and dissolve any wax; up to about 2% by weight of surfactants (such as sodium xylene sulfonate or an imidazoline such as oleic hydroxyethyl imidazoline); up to about 15% by weight of ammonia for a formulation on the alkaline side, or sodium hydroxide if formic acid is present; up to about 5% by weight of corrosion inhibitors (such as 2-mercaptobenzotriazole, benzotriazole or sodium silicate); and, if desired, a small amount (usually no more than 0.1 to 0.3 grams per gallon) of a dye.

Examples (1 to 7) of such strippers with optimized amounts of solvents of this invention are as follows (the ingredient amounts being in parts by weight), together with a comparative example (No. C1) having no terpene:

| | Example Nos: | | | | | | | |
|---|---|---|---|---|---|---|---|---|
| | 1 | 2 | 3 | 4 | 5 | 6 | 7 | C1 |
| benzyl alcohol | 40.0 | 40.0 | 40.0 | 40.0 | 40.0 | 40.0 | 40.0 | 40.0 |
| hydroxypropyl cellulose* | .5 | .5 | .5 | .5 | .5 | .5 | .5 | .5 |
| aromatic hydrocarbon solvent | .5 | .5 | .5 | .5 | .5 | .5 | .5 | .5 |
| paraffin wax | .3 | .3 | .3 | .3 | .3 | .3 | .3 | .3 |
| surfactant | .7 | .7 | .7 | .7 | .7 | .7 | .7 | .7 |
| corrosion inhibitors | 3.5 | 3.5 | 3.5 | 3.5 | 3.5 | 3.5 | 3.5 | 3.5 |
| ammonia | 5.0 | 5.0 | 5.0 | 5.0 | 5.0 | 5.0 | 5.0 | 5.0 |
| water | 41.5 | 25.5 | 33.5 | 29.5 | 33.5 | 29.0 | 25.5 | 49.5 |
| d-limonene | 8.0 | 8.0 | 8.0 | 4.0 | 8.0 | 5.5 | 8.0 | 0 |
| anisole | 0 | 16.0 | 8.0 | 0 | 0 | 11.5 | 8.0 | 0 |
| pyrrole | 0 | 0 | 0 | 16.0 | 8.0 | 3.5 | 8.0 | 0 |

*- The amount of hydroxypropyl cellulose thickener was varied between 0.4 and 0.6 to compensate for varying viscosity due to varying amounts of solvent Comparative stripping tests were run on these formulations in standard performance tests on aluminum panels painted with a Polyurethane Topcoat System (polyurethane topcoat over an epoxy primer) or a Polyurethane Topcoat/

Polyurethane Primer System (polyurethane topcoat over a polyurethane primer). The stripping tests followed MIL-R-81294, a military specification used to evaluate the effectiveness of paint strippers to remove a white polyurethane paint from aluminum. While no tests were done on Epoxy Topcoat Systems (epoxy topcoats over epoxy primers), previous experience has shown that results with Polyurethane Topcoat Systems are similar to that with Epoxy Topcoat Systems. The results of these tests are reported in Table I below, the data showing the percent of the panels stripped in 24 hours on each of the systems:

TABLE I

| Example No. | % of Panels Painted with Polyurethane/ Polyurethane Stripped | % of Panels Painted with Polyurethane/- Epoxy Stripped |
|---|---|---|
| C1* | 0 | 0 |
| 1 | 50 | 40 |
| 2 | 98 | 50 |
| 3 | 96 | 40 |
| 4* | 85 | 20 |
| 5 | 100 | 25 |
| 6 | 100 | 38 |
| 7 | 100 | 38 |

*- These report an average of tests on two separately made formulation batches

Example 1 shows that a terpene (d-limonene) alone is effective for improved stripping on both paint systems. The addition of anisole and/or pyrrole can further enhance stripping, especially on Polyurethane Topcoat/Polyurethane Primer Systems as is evident from Examples 2–7.

What is claimed is:

1. In a paint stripper formulation containing a water-in-oil emulsion having a water phase and a continuous benzyl alcohol phase containing a wax, the improvement comprising incorporating a terpene in the benzyl alcohol phase in an amount effective to retard water evaporation from the water phase.

2. A method of retarding water evaporation from an alkaline water-in-oil emulsion paint stripper having a water phase and a continuous benzyl alcohol phase containing a wax which comprises incorporating into the emulsion's benzyl alcohol phase an effective amount of a terpene.

3. The paint stripper formulation of claim 1 wherein the terpene is d-limonene.

4. The paint stripper formulation of claim 1 wherein the water phase contains ammonia.

5. The paint stripper formulation of claim 4 wherein the terpene is d-limonene.

6. The paint stripper formulation of claim 4 wherein anisole is also incorporated in the benzyl alcohol phase.

7. The paint stripper formulation of claim 6 wherein the terpene is d-limonene.

8. The paint stripper formulation of claim 4 wherein pyrrole is also incorporated in the benzyl alcohol phase.

9. The paint stripper formulation of claim 8 wherein the terpene is d-limonene.

10. The paint stripper formulation of claim 4 wherein anisole and pyrrole are also incorporated in the benzyl alcohol phase.

11. The paint stripper formulation of claim 10 wherein the terpene is d-limonene.

12. The paint stripper formulation of claim 1 wherein the benzyl alcohol phase contains benzyl formate.

13. The paint stripper formulation of claim 12 wherein the terpene is d-limonene.

14. The paint stripper formulation of claim 12 wherein anisole is also incorporated in the benzyl alcohol phase.

15. The paint stripper formulation of claim 14 wherein the terpene is d-limonene.

16. A method of retarding water evaporation from a water-in-oil emulsion paint stripper having a water phase and a continuous benzyl alcohol phase containing a wax which comprises incorporating into the emulsion's benzyl alcohol phase an effective amount of a terpene.

17. A method as in claim 2 wherein anisole is also incorporated into the emulsion's benzyl alcohol phase.

18. A method as in claim 2 wherein pyrrole is also incorporated into the emulsion's benzyl alcohol phase.

19. A method as in claim 2 wherein anisole and pyrrole are also incorporated into the emulsion's benzyl alcohol phase.

20. A method of retarding water evaporation from an acidic water-in-oil emulsion paint stripper having a water phase and a continuous benzyl alcohol phase containing a wax which comprises incorporating into the emulsion's benzyl alcohol phase an effective amount of a terpene.

21. A method as in claim 20 wherein anisole is also incorporated into the emulsion's benzyl alcohol phase.

* * * * *